United States Patent [19]

D'Aquaro et al.

[11] Patent Number: 4,961,638
[45] Date of Patent: Oct. 9, 1990

[54] INTERNAL REARVIEW MIRROR WITH AN ADJUSTABLE SUPPORT FOR MOTOR VEHICLES

[75] Inventors: Domenico D'Aquaro, Arese; Luigi Petrelli, Legnano, both of Italy

[73] Assignee: Alfa Lancia Industriale S.p.A., Arese, Italy

[21] Appl. No.: 318,953

[22] Filed: Mar. 6, 1989

[30] Foreign Application Priority Data

Mar. 10, 1988 [IT] Italy ............................. 19718 A/88

[51] Int. Cl.⁵ ............................................. G02B 5/08
[52] U.S. Cl. .................................... 350/632; 248/477
[58] Field of Search ...................... 248/477, 479, 480; 350/631, 632, 604, 605, 637, 639, 631, 632

[56] References Cited

U.S. PATENT DOCUMENTS

| | | | |
|---|---|---|---|
| 2,836,104 | 12/1954 | Bertel et al. | 248/480 |
| 4,848,888 | 7/1989 | Polzer | 350/632 |
| 4,856,885 | 8/1989 | Fimeri | 350/637 |

Primary Examiner—Bruce Y. Arnold
Assistant Examiner—Tho Van Tran
Attorney, Agent, or Firm—Charles E. Brown; Charles A. Brown

[57] ABSTRACT

A rearview mirror located in the interior of a motor vehicle passenger compartment, the support for the mirror being adjustable telescopically be the guided movement of an inner tube within an outer tube.

5 Claims, 1 Drawing Sheet

INTERNAL REARVIEW MIRROR WITH AN ADJUSTABLE SUPPORT FOR MOTOR VEHICLES

It is a legal requirement that a rearview mirror be installed in the passenger compartment of a motor vehicle in a position such that the eyes of the driver can embrace within the mirror reflecting surface a predetermined field of indirect rear vision. It is apparent that the ocular points of the driver vary relative to the mirror surface according to the driver's height, the position of his seat and the type of driving involved, so that in order to be able to embrace the predetermined field of rear vision, mirrors are used which can be adjusted about various axes of rotation.

Current internal rearview mirrors mostly consist of a reflecting surface disposed within a support frame which is connected by an articulated joint to a support leg fixed to the vehicle body. The object of the present invention is to provide an internal rearview mirror, the support of which enables the driver to adjust the mirror for the purpose of embracing the predetermined field of vision by a single simple vertical movement.

This object is attained by a rearview mirror comprising a support secured at one end to a fixing base and at its other end to the mirror frame, characterised in that the support consists of an outer tube and an inner tube, one rigid with the fixing base and the other rigid with the mirror frame, the outer and inner tubes being engaged by way of mutual guide and locking means.

Advantageously the guide means consist of a groove and a projection provided in the outer and inner tubes.

Preferably, the locking means consist of an operating lever provided with a locking pad arranged to engage the outer tube under the action of a spring.

Advantageously a locking groove is provided in the outer tube to receive the pad. The guide groove and the locking groove preferably extend helically and the outer tube and inner tube have their respective axes preferably of curved extension.

A rearview mirror with a support constructed in this manner allows the driver to make functional and simple adjustments.

Characteristics and advantages of the invention will be apparent from the description of a preferred embodiment thereof given hereinafter by way of non-limiting example with reference to the accompanying drawings, in which.

Figure 1:
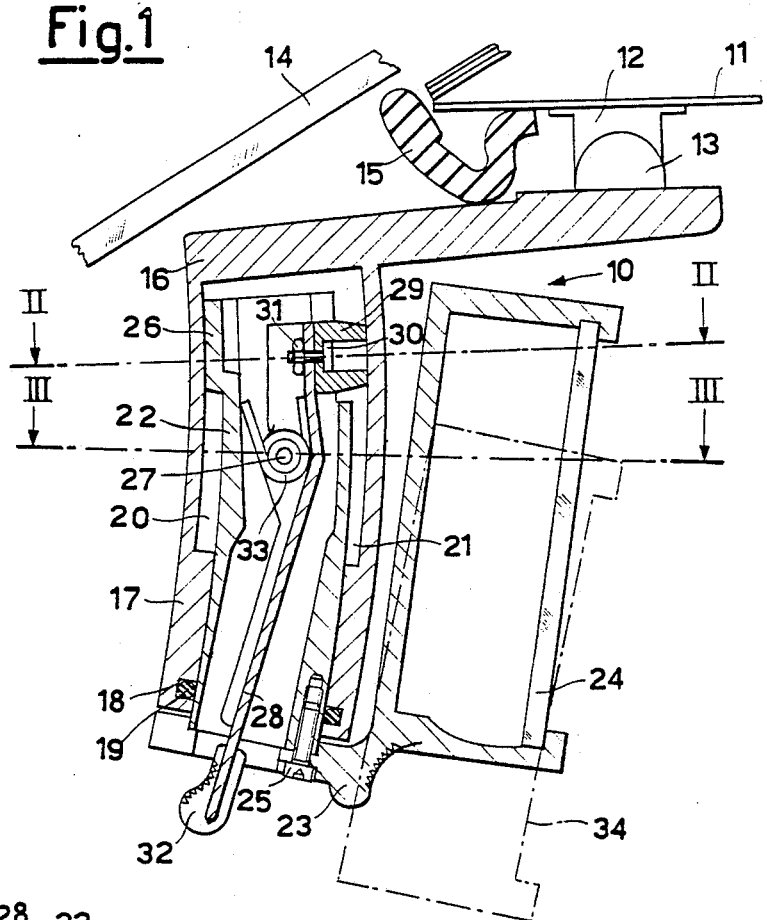
FIG. 1 is a vertical section through the rearview mirror according to the invention.
Figure 2:
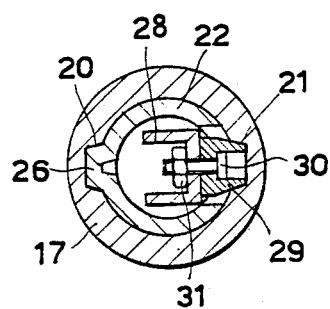
FIG. 2 is a section through the support on the line II—II of FIG. 1.
Figure 3:
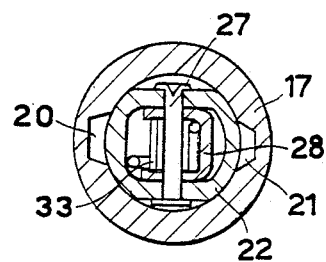
FIG. 3 is a section through the support on the line III—III of FIG. 1.

In FIG. 1 the reference numeral 10 indicates overall a rearview mirror mounted on the sheet metal 11 of an automobile body by fixing devices indicated by 12 and 13. The reference numeral 14 indicates the windscreen and 15 indicates a trim member. The reference numeral 16 indicates a fixing base with which there is rigid an outer tube 17 in which there are provided a seat 18 for a split ring 19, a guide groove 20 and a locking groove 21.

The reference numeral 22 indicates an inner tube, to the end of which a support frame 23 for the mirror 24 is rigidly fixed by a screw 25. A guide projection 26 is provided in the inner tube 22, and on this latter there is rotatably supported by a pin 27 an operating lever 28 to which a pad 29 of friction material is fixed by a bolt 30 and nut 31. The operating lever 28 is provided with a handgrip 32 and a spring 33 which urges the pad 29 into the locking groove 21 of the outer tube 17.

An intermediate position of the rearview mirror is indicated by dashed and dotted lines 34.

To adjust the rearview mirror, the lever 28 is operated by means of the handgrip 32 to overcome the force of the spring 33 so as to disengage the pad 29 from the locking groove 21 and enable the inner tube 22 to be slid in the outer tube 17. The driver can now move the inner tube 22 mainly vertically within the outer tube 17, guided in its travel by the projection 26 lying in the guide groove 20.

The guide groove 20 and locking groove 21 can extend either rectilinearly or helically so as to impress on the mirror not only a vertical movement but also a simultaneous horizontal movement.

Both the outer tube 17 and inner tube 22 can be of curved axis as shown in FIG. 1.

The pad 29 could be replaced by a peg able to engage in corresponding holes provided in the wall of the outer tube 17 as a replacement for the locking groove 21.

We claim:

1. An inner rearview mirror for a motor vehicle, said inner rearview mirror comprising a support and a mirror having a frame, said support having a pair of ends, said support being secured at one end to a fixing base and at its other end to the mirror frame, said support further consisting of an outer tube and an inner tube, one of said tubes being rigid with said fixing base and the other of said tubes being rigid with the mirror frame, said outer and inner tubes being engaged with each other by way of mutual guide and locking means, wherein said locking means consist of a locking groove and an operating lever provided with a locking pad arranged to engage the outer tube under the action of a spring.

2. A rearview mirror as claimed in claim 1B, wherein said guide means consists of a guide groove and a projection provided in said outer and inner tubes.

3. A rearview mirror as claimed in claim 1, wherein said locking groove is provided in the outer tube to receive said pad.

4. A rearview mirror as claimed in claim 3, wherein said guide groove and said locking groove extend helically.

5. An inner rearview mirror for a motor vehicle, said inner rearview mirror comprising a support and a mirror having a frame, said support having a pair of ends, said support being secured at one end to a fixing base and at its other end to the mirror frame, said support further consisting of an outer tube and an inner tube, one of said tubes being rigid with said fixing base and the other of said tubes being rigid with the mirror frame, said outer and inner tubes being engaged with each other by way of mutual guide and locking means, the outer and inner tubes both have curved axes.

* * * * *